W. H. BOWLES.
Adjustable Roller and Stalk Cutter.
No. 218,423. Patented Aug. 12, 1879.
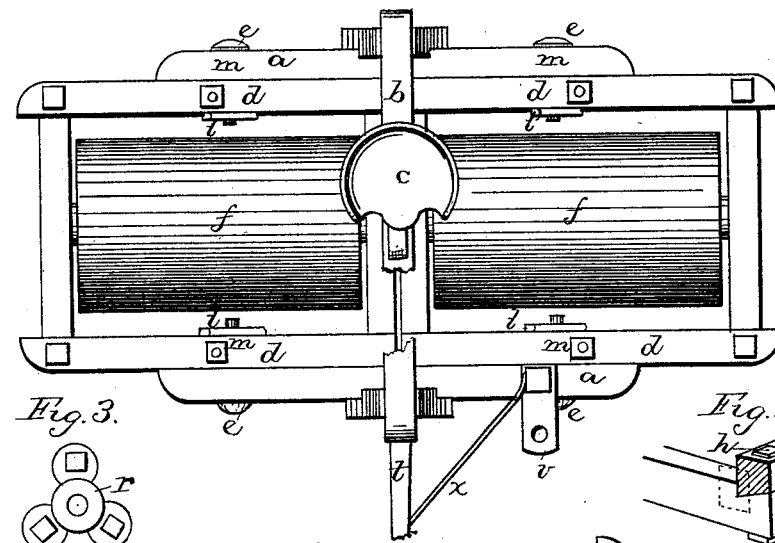
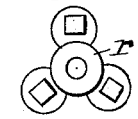
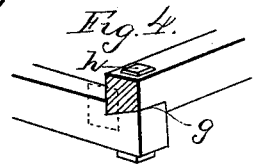
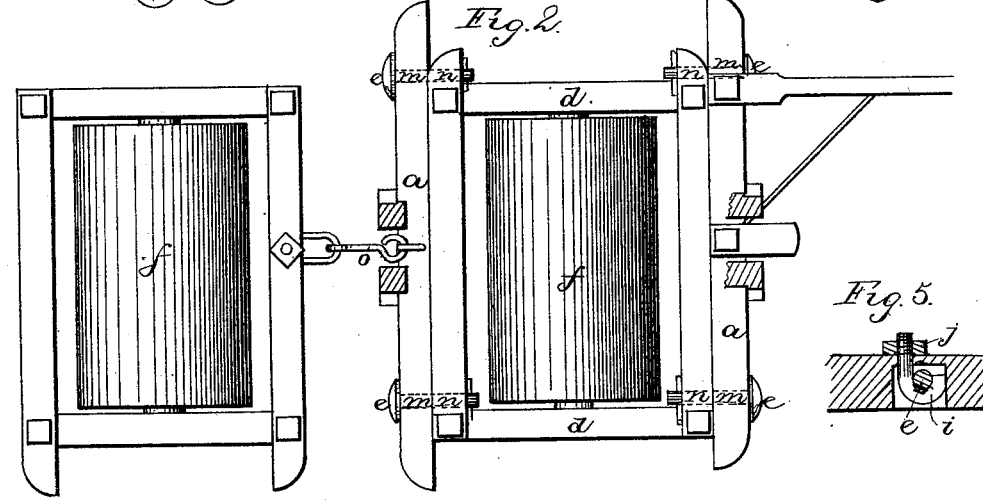
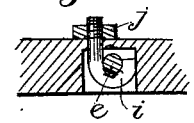
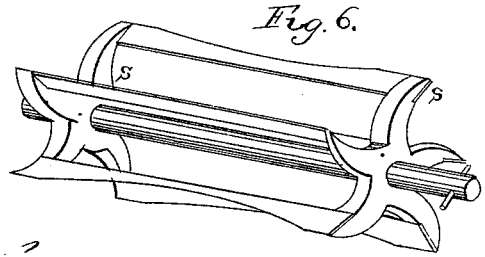
Witnesses:
J. W. Garner
Wm. H. Bates.
Inventor:
Wm. H. Bowles,
per
F. A. Lehmann,
Atty

UNITED STATES PATENT OFFICE.

WILLIAM H. BOWLES, OF EMDEN, ILLINOIS.

IMPROVEMENT IN ADJUSTABLE ROLLER AND STALK-CUTTER.

Specification forming part of Letters Patent No. 218,423, dated August 12, 1879; application filed June 17, 1879.

*To all whom it may concern:*

Be it known that I, W. H. BOWLES, of Emden, in the county of Logan and State of Illinois, have invented certain new and useful Improvements in Adjustable Roller and Stalk-Cutter; and I do hereby declare the following to be a full, clear, and exact description of the invention, such as will enable others skilled in the art to which it pertains to make and use it, reference being had to the accompanying drawings, which form part of this specification.

My invention relates to an improvement in land-rollers and stalk-cutters; and it consists in the peculiar arrangement and combination of parts, that will be more fully described hereinafter, whereby a cheap, simple, and effective machine is produced.

Figure 1 is a plan view of my invention. Fig. 2 is a similar view of the same, showing the rollers arranged one behind the other. Figs. 3, 4, 5, 6 are detail views of different parts.

$a$ represents two parallel beams, which are connected together by the beam $b$, upon which the seat $c$ is secured, and which beams $a$ form the outside frame, in which the two inside frames, $d$, are pivoted. The pivotal bolts $e$, upon which the inside frames freely turn, so as to accommodate the rollers $f$ to any inequality of the ground, pass through the ends of the beams $a$ and through the centers of the frames $d$, whereby a bearing of over half the length of the rolls is obtained, making it impossible for the rolls to get out of line, and at the same time allowing perfect adjustability without extra strain on the hinge.

The end of each of the beams which form the inside frames, $d$, have an inclined recess, $g$, made in them, and these recesses come together, and through the ends thus recessed are passed the bolts $h$, which secure the beams rigidly together. By means of these inclined planes the joints can always be rigidly fastened by simply turning the nut on the lower end of the bolt $h$.

As the bolts $e$ upon which the frames turn would soon wear loose, the friction-loops $i$ are used as bearings, and as a means of taking up any wear that may take place. The hooks fit in recesses made in the under side of the frame, so as to bear up against the under side of the bolts, while their upper screw ends pass up through the top of the frame and receive a nut, $j$. By means of these nuts the hooks can be drawn tightly up against the under sides of the bolts $e$, so that pretty much all of the wear will come directly on the hooks, and thus prevent the frames from being injured. When it is desired to remove one of the inner frames from the outer one it is only necessary to remove the keys $l$ from the inner ends of the bolts $e$, when the inner frame can at once be detached.

In moving the machine from place to place, where narrow bridges are to be crossed, or where narrow roads are to be passed through, the two inner frames are loosened, and then all four pivotal bolts $e$ are passed through the four holes $m$ in the outer frame and the corresponding holes $n$ in the ends of the frame $d$, whereby the outer frame and this one inner frame are bound rigidly together, the center of the roller $f$ coming directly under the seat $c$. The other frame $d$ is then hitched on behind by means of a chain or other similar device, $o$, and in this way the machine may be hauled across narrow bridges and through narrow gates and roads, where the machine otherwise could not pass.

When it is desired to cut stalks one or both of the rollers may be removed, and a stalk-cutter, $s$, substituted in their place. This cutter is provided with curved knives or cutters, as shown, so as to conform to the shapes of the rows in which the corn is planted. To remove one of the rollers, it is only necessary to remove one of the end beams of its frame, when the roller will at once drop out. The journals for the rollers consist of flat plates, of the form shown, which are sunk into the end of the roller, and through each wing is passed a square-headed bolt. From the center of this plate $r$ projects the journal, which has its bearing in the end timber of the frame.

To the top edge of the outside frame is bolted the tongue $t$, and to one side of the tongue is bolted the hitching-block $v$, and these two parts are rigidly connected together by the brace $x$. As arranged as shown in Fig. 1 this tongue is adapted for two horses only; but when it is necessary to use three horses, as when the two stalk-cutters are being used, both the tongue and the block are detached and their places changed, as shown. In this way the block is fastened at the center of the outside frame, and the tongue comes near the end. While in this position three horses can be used where only two could be used before.

Having thus described my invention, I claim—

In a land-roller, the combination of the outside frame, $a$, insides frames, $d$, bolts $e$, and chain, the inside and outer frames being provided with holes whereby the inside frame can be bolted rigidly to the outer one, and the second roller and frame be attached behind by means of the chain, substantially as shown.

In testimony that I claim the foregoing I have hereunto set my hand this 12th day of June, 1879.

WM. HUGHES BOWLES.

Witnesses:
 WM. HARNAHAN,
 PHILIP WARD.